US007960468B2

(12) United States Patent
Becker et al.

(10) Patent No.: US 7,960,468 B2
(45) Date of Patent: Jun. 14, 2011

(54) COATING COMPOSITIONS AND PROCESS FOR THE PRODUCTION OF MULTILAYER COATINGS

(75) Inventors: Wiebke Becker, Essen (DE); Volker Duecoffre, Wuppertal (DE); Carmen Flosbach, Wuppertal (DE); Birgit Kleuser, Wuppertal (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/953,311

(22) Filed: Sep. 29, 2004

(65) Prior Publication Data

US 2006/0069202 A1 Mar. 30, 2006

(51) Int. Cl.

| | |
|---|---|
| ***C08L 31/00*** | (2006.01) |
| ***C08L 33/00*** | (2006.01) |
| ***C08L 51/00*** | (2006.01) |
| ***C08L 67/00*** | (2006.01) |
| ***C08L 75/00*** | (2006.01) |

(52) U.S. Cl. ........ 524/507; 524/504; 524/500; 524/601; 524/589; 524/502

(58) Field of Classification Search .................. 524/502, 524/558, 556, 504, 500, 507, 601, 589
See application file for complete search history.

(56) References Cited

U.S. PATENT DOCUMENTS

| | | | | |
|---|---|---|---|---|
| 4,227,929 | A * | 10/1980 | Law et al. | 106/1.17 |
| 5,480,936 | A | 1/1996 | Duecoffre et al. | |
| 5,852,120 | A * | 12/1998 | Bederke et al. | 525/124 |
| 6,001,947 | A * | 12/1999 | Brunnemann et al. | 528/28 |
| 6,048,936 | A * | 4/2000 | Epple et al. | 525/124 |
| 6,268,021 | B1 * | 7/2001 | Flosbach et al. | 427/407.1 |

FOREIGN PATENT DOCUMENTS

| | | |
|---|---|---|
| EP | 579 193 | 1/1994 |
| EP | 812 867 | 11/1994 |
| EP | 626 432 | 12/1997 |

OTHER PUBLICATIONS

The PCT International Search Report and the Written Opinion of the International Searching Authority, No. PCT/US2005/035080, mailed Feb. 13, 2006.

* cited by examiner

*Primary Examiner* — Karuna P Reddy
(74) *Attorney, Agent, or Firm* — Sudhir G. Desbmukh

(57) ABSTRACT

An aqueous coating composition, comprising
A) at least one water-dilutable hydroxy-functional binder and
B) at least one polyisocyanate crosslinking agent with free isocyanate groups,
wherein component A) comprises
A1) 40-95 wt. % of at least one water-dilutable hydroxy-functional (meth)acrylic copolymer with a hydroxyl value of 60-250 mg of KOH/g and an acid value of 5-50 mg of KOH/g, which is obtained by free-radical copolymerization performed in a non-aqueous phase, wherein the ratio of primary hydroxyl groups to secondary hydroxyl groups in the (meth)acrylate copolymer A1) is 1:0.1 to 1:1.2 and at least 80% of the secondary hydroxyl groups result from reaction products of a monoepoxy ester and an unsaturated acid-functional monomer, and
A2) 5-60 wt. % of at least one water-dilutable polyester oligomer, wherein the total of the weight percentages of component A1) and A2) add up to 100 wt. % and wherein the free-radical polymerization for the production of component A1) is performed at least in part in the presence of component A2) and/or wherein component A2) is added during polymerization or after completion of polymerization.

10 Claims, No Drawings

COATING COMPOSITIONS AND PROCESS FOR THE PRODUCTION OF MULTILAYER COATINGS

FIELD OF THE INVENTION

The invention relates to two-component coating compositions and to a process for the production of multilayer coatings using these coating compositions, in particular, for the production of outer clear coat and top coat layers of multilayer coatings.

DESCRIPTION OF RELATED ART

Coating compositions usable as automotive clear or top coats, which compositions contain polyester polyol/(meth) acrylic copolymer hybrid binders in the form of seed polymers produced by free-radical copolymerisation of appropriate olefinically unsaturated monomers in the presence of polyester polyols, are known from the prior art.

EP 579 193 accordingly describes aqueous coating compositions containing hydroxy-functional, water-emulsifiable copolymers, which may be produced in the presence of polyester oligomers, as binder and blocked polyisocyanates and amino resins as crosslinking agents. EP 812 867 describes aqueous coating compositions containing hydroxy-functional (meth)acrylic copolymers and hydroxy-functional polyesters, wherein at least 50 wt. % of the (meth)acrylic copolymers are produced in the presence of the polyesters, as binder, in combination with triazine triscarbamates as crosslinking agent. Due to the relatively high curing temperatures required for crosslinking, the above-stated coating compositions are not suitable for applications which permit only moderate curing temperatures of, for example, less than 80° C., such as, for example, in vehicle repair coating.

EP 626 432 describes polyester/polyacrylate hybrid binders, which may be used in two-component coatings with polyisocyanate crosslinking agents. The binders are obtained in this case by producing acrylate copolymers with hydrophobic and hydrophilic moieties in the presence of a polyester oligomer. The hydrophobic moieties are here based on esters of unsaturated carboxylic acids with secondary hydroxyl groups and the hydrophilic moieties are based on esters of unsaturated carboxylic acids with primary hydroxyl groups and unsaturated, acid-functional monomers, wherein the ratio of primary hydroxyl groups to secondary hydroxyl groups in the acrylate moiety is 1:1.5 to 1:2.5. The disadvantage of these formulations is that only unsatisfactory compatibility or miscibility with conventional hydrophobic polyisocyanates is obtained.

There is accordingly a requirement for aqueous coating compositions based on hydroxy-functional binders, which compositions exhibit good compatibility or miscibility of the hydroxy-functional binders with conventional hydrophobic polyisocyanates, i.e., polyisocyanates, which are not specifically hydrophilically modified. Mixing of the components should here be relatively straightforward without involving the use of comparatively large quantities of organic solvents and without exposure to elevated shear.

When ready to apply, the coating compositions should have an elevated solids content, contain minimal quantities of organic solvents and yield optically perfect coatings with good mechanical properties.

SUMMARY OF THE INVENTION

The present invention provides aqueous coating compositions, comprising

A) at least one water-dilutable hydroxy-functional binder and

B) at least one polyisocyanate crosslinking agent with free isocyanate groups, wherein component A) comprises A1) 40-95 wt.-%, preferably 55-75 wt. % of at least one water-dilutable hydroxy-functional (meth)acrylic copolymer with a hydroxyl value of 60-250 mg of KOH/g, preferably, of 80-170 mg of KOH/g and an acid value of 5-50 mg of KOH/g, preferably, of 10-35 mg of KOH/g, which is obtained by free-radical copolymerization performed in a non-aqueous phase, wherein I) in a first step the following monomers are polymerized:

a) 20-65% by weight, preferably, 30-60% by weight, of a reaction product of a monoepoxyester and an unsaturated acid functional monomer, b) 5-20% by weight, preferably, 10-20% by weight, of at least one hydroxy functional unsaturated monomer which is different from component a), c) 0-15% by weight, preferably, 0-5% by weight, of an unsaturated acid functional monomer and d) 5-70% by weight, preferably, 25-45% by weight, of at least one other polymerizable unsaturated monomer, wherein the % by weight of components a) to d) add up to 100% by weight and wherein II) in at least one further step the following monomers are polymerized:

b) 1540% by weight, preferably, 25-30% by weight, of at least one hydroxy functional unsaturated monomer which is different from component a), c) 5-30% by weight, preferably, 10-25% by weight, of an unsaturated acid functional monomer and d) 30-80% by weight, preferably, 50-60% by weight, of other polymerizable unsaturated monomers, wherein the % by weight of components b) to d) add up to 100% by weight and wherein the ratio of primary hydroxyl groups to secondary hydroxyl groups in the (meth)acrylate copolymer is 1:0.1 to 1:1.2, preferably, 1:0.2 to 1:1.1, and at least 80% of the secondary hydroxyl groups result from the monomers a), and A2) 5-60 wt. %, preferably 2545 wt. % of at least one water-dilutable polyester oligomer, preferably, with a calculated molar mass of 200-4000 g/mol, wherein the total of the weight percentages of component A1) and A2) add up to 100 wt. % and wherein the free-radical polymerization for the production of component A1) is performed at least in part in the presence of component A2) and/or wherein component A2) is added during polymerization or after polymerization is complete.

DETAILED DESCRIPTION OF THE EMBODIMENTS

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, “a” and “an” may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

It has surprisingly been found that the binder composition consisting of the (meth)acrylate copolymer A1) and the polyester oligomer A2) has good compatibility in waterborne systems and can be easily mixed with hydrophobic polyisocyanates, i.e., not specially hydrophilically modified polyisocyanates, to become coatings that have good optical appearance, e.g., good gloss and flow as well as good resistance to chemicals and moisture and mechanical influences that, for example, cause scratching and marring.

The term (meth)acrylic as used here and hereinafter should be taken to mean methacrylic and/or acrylic.

All molecular weights referred to herein are determined by GPC (gel permeation chromatographie) using polystyrene as the standard.

The coating composition of the present invention preferably comprises 30-95% by weight solids of the hydroxy functional binder composition A) and 5-70% by weight solids of the curing agent with free isocyanate groups B).

The hydroxy-functional binder A), prepared from the (meth)acrylic copolymer A1) and the polyester oligomer A2), contained in the coating composition according to the invention is a hybrid binder or binder mixture, depending on whether the (meth)acrylic copolymer A1) was at least in part produced in the presence of the polyester oligomer A2) or was not added until polymerization was complete. In the former case, the result is also often known as an interpenetrating polymer network. It is not a graft copolymer formed by free-radical graft copolymerization of the monomer mixture onto olefinically unsaturated double bonds in the polyester oligomer A2) or onto free-radical sites formed on the backbone of the polyester oligomer A2) by H abstraction. Of course, the formation of graft copolymer structures in the seed polymer by corresponding secondary reactions cannot be completely ruled out, but the formation of such structures is not deliberately sought and, to the extent that influence may be exerted by selection of raw materials and selection of reaction conditions, is also avoided.

The (meth)acrylate copolymer A1) is prepared by a skew feed polymerization process with at least two feed streams. Skew feed polymerization as used herein means a multi-step reaction wherein products of previous reaction steps are combined with additional reactants in a sequential fashion to yield the desired copolymer. The preferred embodiment of this invention is a two-step skew feed polymerization wherein a first group of monomers are reacted to form an intermediate polymer and a second group of monomers are reacted in the presence of the intermediate polymer to form the copolymer used in this invention.

The water-dilutable (meth)acrylate copolymer A1) typically has a weight average molecular weight (Mw) of 10 000-200 000, preferably of 17 000-40 000. The (meth)acrylic copolymer is produced by radical polymerization of the aforementioned components a) to d).

Component a) is the reaction product of monoepoxyesters and unsaturated acid functional compounds. These monoepoxyesters are preferably glycidyl esters derived from aliphatic saturated monocarboxylic acids with a tertiary or quaternary carbon atom in the_alpha position. It is preferred to use glycidyl esters of saturated alpha, alpha-dialkylalkane-monocarboxylic acids with 5 to 13 C atoms in the acid molecule, in particular, preferably, 9 to 11 C atoms in the acid molecule. Examples for glycidylesters are the glycidyl esters derived from versatic acid and the glycidyl esters derived from pivalic acid. The glycidyl ester derived from versatic acid is particularly preferred. Suitable monoepoxyesters of this type are obtainable commercially, for example, under the name of Cardura®. Examples for aliphatic unsaturated monocarboxylic acids are (meth)acrylic acid, crotonic acid and isocrotonic acid.

Maleic acid, fumaric acid and derivatives therefrom can also be used, e.g., reaction products of maleic anhydride with monoalcohols that form maleic acid half ester-acids. These half ester-acids can also be reacted with the monoepoxyesters. A preferred unsaturated acid functional compound is (meth)acrylic acid.

Further possible components a) are reaction products of tertiary fatty acids with up to 12 carbon atoms and epichlorohydrine as well as reaction products of epoxy functional unsaturated monomers, e.g., glycidyl(meth)acrylate, and acids, e.g., aliphatic saturated monocarboxylic acids with a tertiary or quaternary carbon atom in the alpha position.

Particularly preferred components a) are reaction products of glycidyl esters derived from versatic acid and (meth) acrylic acid.

Further possible components a) are reaction products of tertiary fatty acids with up to 12 carbon atoms and epichlorohydrine. Component a) is a hydroxy-functional polymerizable reaction product with secondary hydroxyl groups and can be formed during the course of production of the (meth) acryl copolymers.

Component b) relates to hydroxy-functional olefinic unsaturated monomers, which are different from component a). Examples of component b) are hydroxyalkyl esters with primary or secondary hydroxyl groups derived from alpha, beta-olefinic unsaturated monocarboxylic acids. These can include, for example, hydroxyalkyl esters from acrylic acid, methacrylic acid, crotonic acid and/or iso-crotonic acid. Hydroxyalkyl esters derived from (meth)acrylic acid are preferred. The hydroxyalkyl groups can contain, for example, 1 to 10 C atoms, preferably 2 to 6 C atoms. Examples of suitable hydroxyalkyl esters of alpha, beta-olefinic unsaturated monocarboxylic acids with primary hydroxyl groups are hydroxyethyl(meth)acrylate, hydroxypropyl(meth)acrylate, hydroxybutyl(meth)acrylate, hydroxyamyl (meth)acrylate, hydroxyhexyl(meth)acrylate. Examples of suitable hydroxyalkyl esters with secondary hydroxyl groups are 2-hydroxypropyl(meth)acrylate, 2-hydroxybutyl(meth)acrylate, 3-hydroxybutyl(meth)acrylate.

Reaction products from hydroxyalkyl(meth)acylates with lactones can also be used for component b). In this way, at least part of the aforementioned hydroxyalkyl esters of alpha, beta-unsaturated monocarboxylic acids can be modified. The modification results from an esterification reaction taking place by opening the lactone ring. During the reaction, new hydroxyl groups are formed in the final phase in the form of hydroxyalkyl ester groups matching the appropriate lactone. The aforementioned are examples of hydroxyalkyl(meth) acrylates that can be used. Suitable lactones are, for example, those that contain 3 to 15 C atoms in a ring, it is possible for the rings to have different substituents. Preferred lactones are gamma-butyrolactone, delta-valerolactone, epsilon-caprolactone, beta-hydroxy-beta-methyl-delta-valerolactone, lambda-laurinlactone or mixtures thereof. Epsilon-caprolactone is particularly preferred. The reaction products preferred are those of one mol of a hydroxyalkyl ester of an alpha, beta-unsaturated monocarboxylic acid and 1 to 5 mol, preferably, an average of 2 mols, of a lactone. Modification of the hydroxyl groups of the hydroxyalkyl esters with the lactone can take place before, during or after carrying out the copolymerization reaction.

Component c) relates to radical polymerizable olefinic unsaturated carboxyl-functional monomers. Examples of suitable components c) are olefinic unsaturated mono- and/or dicarboxylic acids, such as, (meth)acrylic acid, maleic acid, fumaric acid, crotonic acid and isocrotonic acid, as well as, the corresponding semi-esters and anhydrides of olefinic unsaturated dicarboxylic acids. The acid residue of these carboxylic acids has generally 1 to 8 C atoms. Unsaturated fatty acids with 8 to 22 C atoms can also be used, such as, for example, linolenic acid, linoleic acid, oleic acid or dehydrated castor acid. The use of (meth)acrylic acid is particularly preferred. Component c) is not used to prepare the reaction product a).

Component d) relates to olefinic unsaturated monomers, which differ from monomers a) to c). It can include olefinic unsaturated monomers that, apart from having at least one olefinic double bond, do not contain any other reactive functional groups. Examples of suitable unsaturated monomers with no other functional groups are esters of unsaturated carboxylic acids with aliphatic monohydric branched or linear as well as cyclic alcohols with 1 to 20 C atoms. Examples of unsaturated carboxylic acids are acrylic acid, methacrylic acid, crotonic acid and isocrotonic acid. Esters of (meth) acrylic acid are preferred. Examples of (meth)acrylic acid esters with aliphatic alcohols are methylacrylate, ethylacrylate, isopropylacrylate, tert.-butylacrylate, n-butylacrylate, isobutylacrylate, 2-ethylhexylacrylate, laurylacrylate, stearylacrylate and appropriate methylacrylates. Examples of (meth)acrylic acid esters with cyclic alcohols are cyclohexylacrylate, trimethylcyclohexylacrylate, 4-tert. butylcyclohexylacrylate, isobornylacrylate and appropriate methacrylates. Examples of (meth)acrylic acid esters with aromatic alcohols are benzyl(meth)acrylates.

Examples of further but not preferred suitable unsaturated monomers without other functional groups are vinyl esters, such as, for example, vinyl acetate, vinyl propionate and vinyl esters derived from branched saturated monocarboxylic acids in alpha position, for example, vinyl esters derived from saturated alpha, alpha' dialkylalkane monocarboxylic acids and vinyl esters derived from saturated alpha-alkylalkane monocarboxylic acids each with 5 to 13 carbon atoms, preferably, 9 to 11 carbon atoms in the molecule.

Small amounts of olefinic polyunsaturated monomers can also be used. These are monomers with at least 2 radically polymerizable double bonds. Examples of these are divinylbenzene, 1,4-butanediol diacrylate, 1,6-hexanediol diacrylate, neopentylglycoldimethacrylate, glycerine dimethacrylate.

Examples of further suitable unsaturated monomers without other functional groups are vinylaromatic monomers, for example, styrene, alpha-methyl styrene, o-, m-, p-methyl styrene, 2,5-dimethyl styrene, tertiary butyl styrene and vinyl toluene.

Component d) may also include olefinic unsaturated monomers with other functional groups, for example, (meth) acrylamides and their derivatives, (meth)acrylonitriles, silane-functional unsaturated monomers, such as, for example, methacryloxypropyl trialkoxysilanes, vinyl trialkoxysilanes, each with, for example, 1 to 5 carbon atoms in the alkoxy group, acetoacetyl-functional unsaturated monomers, such as, for example, acetoacetoxy ethylmethacrylate, unsaturated monomers containing urea groups, such as, for example, ethylene urea ethyl methacrylate and unsaturated monomers containing urea groups, such as, for example, dialkylaminoethyl(meth)acrylates with, for example, 1 to 5 carbon atoms in the alkyl group.

Preferably, component d) comprises vinylaromatic monomers (d1) and/or esters of unsaturated carboxylic acids with aliphatic monohydric branched or linear as well as cyclic alcohols with 1 to 20 C atoms (d2). Styrene and esters of (meth)acrylic acid with aliphatic monohydric branched or linear as well as cyclic alcohols with 1 to 20 C atoms are preferred components d1 and d2.

A preferred (meth)acrylate copolymer comprises:

a) 20-50% by weight of at least one reaction product of a monoepoxyester and an unsaturated acid functional monomer, b) 10-30% by weight of at least one hydroxyalkyl ester derived from alpha, beta-olefinic unsaturated monocarboxylic acids, c) 5-15% by weight of at least one an unsaturated acid functional monomer, d1) 15-25% by weight of at least one vinylaromatic monomer and d2) 5-30% by weight of at least one ester of (meth)acrylic acid with aliphatic monohydric branched or linear as well as cyclic alcohols with 1 to 20 C atoms, wherein the % by weight of components a), b), c), d1) and d2) adds up to 100% by weight.

The hydroxy-functional (meth)acrylic copolymer contained in the coating compositions according to the invention is produced by radical copolymerization, preferably, in presence of the polyester oligomer A2). Radical polymerization is following the usual method by a person skilled in the art. It is essential to prepare the (meth)acrylic copolymers used in the present invention by a skew feed polymerization process, preferably, with two feed streams.

More specficially, the (meth)acrylic copolymer A1) used in this invention is preferably made by first charging a reflux reactor with a monoepoxyester, an organic solvent or solvent blend and optionally with the polyester oligomer A2). The temperature the reactor contents is typically held between 60° C. and 280° C. during polymerization. For example, a first feed stream comprising a mixture of a first quantity of unsaturated acid-functional monomer, in an equivalent amount to react with the monoepoxyester and build the reaction product of monoepoxyester and unsaturated acid-functional monomer, a hydroxyfunctional monomer, a further unsaturated monomers, and an initiator is charged to the reactor over a period of time. After addition of the first feed stream, the reactor contents are rinsed with additional organic solvent. A second feed stream comprising, for example, a second quantity of the unsaturated acid-functional monomer, in an amount to provide the copolymer with the desired acid number, further unsaturated monomers, additional organic solvent, and additional initiator is charged to the reactor over a period of time.

The total amount of the unsaturated acid-functional monomer c) can be varied between the first and second feed streams, but it is essential that the first feed stream comprises the lower amount of unsaturated acid functional monomer c), namely, 0-30% by weight of the unsaturated acid functional monomer c) based on the total amount of monomer c). Preferably, the first feed stream is free of unsaturated acid-functional monomer c). Component c) does not include the amount of unsaturated acid-functional monomer which is used to build the reaction product a).

After addition of the second feed stream, which comprises the remaining % by weight of each component the reactor contents are typically rinsed with additional organic solvent, held for a period of time at reflux, and rinsed a final time with additional organic solvent. The reactor contents are cooled and then partially or wholly neutralized by the addition of the appropriate amount of a base and converted into an aqueous dispersion by normal or inverse dilution with water. The individual monomers a) to d) are each introduced in such molar amounts that the finished (meth)acrylate copolymer has the hydroxyl and acid numbers defined at the beginning.

The polymerization for the production of the (meth)acrylic copolymer A1) may at least in part proceed in the presence of the polyester oligomer A2), for example, in the presence of 10-50 wt. % of polyester oligomer A2), relative to the total quantity of polyester oligomer A2), and/or the polyester oligomer A2) is added during polymerisation or after polymerization is complete. In the former case, the polyester oligomer A2), optionally mixed with one or more organic solvents, for example, as a 40 to 95 wt. % organic solution, is initially introduced, preferably together with the monoepoxy ester (which serves to form the reaction product of monoepoxy ester and unsaturated, acid-functional monomer), into the reaction vessel, is heated to reaction temperature and then the stepwise polymerization is performed. The free-radical copolymerization is performed, for example, at temperatures of 80° C. to 180° C., preferably at 100° C. to 150° C.

The copolymerization reaction may be initiated with conventional initiators which are thermally dissociable into free radicals. Examples of free-radical initiators are dialkyl peroxides, such as di-tert.-butyl peroxide, dicumyl peroxide; diacyl peroxides, such as, dibenzoyl peroxide, dilauroyl peroxide; hydroperoxides, such as, cumene hydroperoxide, tert.-butyl hydroperoxide; peresters, such as, tert.-butyl perbenzoate, tert.-butyl per-2-ethylhexanoate; peroxy dicarbonates; perketals; ketone peroxides, such as cyclohexane peroxide, methyl isobutyl ketone peroxide and azo compounds, such as, azobisisobutyronitrile; C—C-cleaving initiators, such as, for example, benzopinacole derivatives.

The free-radical initiators are in general added, for example, in a quantity of 0.1 to 4 wt. %, relative to the total quantity of monomers used. In the copolymerization, in stage I the monomers a) to d) are initially added in the above-defined quantities and polymerized. The monomers may here contain the free-radical initiators or the free-radical initiators may be added to the monomer mixture optionally, with a slight time delay or separately.

Conventional chain-transfer agents, such as, mercaptans, thioglycolic acid esters, chlorinated hydrocarbons, cumene, dimeric $\alpha$-methylstyrene may also be used in the free-radical copolymerisation.

As described above, the free-radical copolymerization may according to a first variant proceed in the presence of the polyester oligomer A2), which may be present as a solution in an organic solvent (mixture). The solvents which may, for example, be used are those as are also used on or after conclusion of synthesis of the polyester oligomer A2); the polyester oligomer A2) may accordingly initially be introduced as the solution which was obtained on production thereof. Other suitable solvents may, however, also be used.

The polyester oligomer A2) may, however, also be added during polymerization or after polymerisation is complete. In the case of addition after polymerization, the (meth)acrylic copolymer composition obtained after the free-radical polymerization may first be cooled down somewhat, for example to 120° C.

It is essential for the polyester oligomer A2) to be added before the organic solvents are removed by distillation. In this manner, it is ensured that the organic solvents still present in the composition may straight forwardly be removed by distillation without the molar mass of the polymers rising to an undesirable extent and resulting in gelation. Solvent-free dispersions may thus straightforwardly be obtained.

The polyester oligomer A2), preferably, comprises a non-aromatic polyester polyol, i.e., it is composed of non-aromatic polyester structural units. The polyester oligomer A2), preferably, also contains no olefinic double bonds, i.e., it preferably also contains no olefinically unsaturated polyester structural units.

The polyester oligomer A2) used exhibits, for example, a calculated molecular mass of 200-4000, preferably, of 200-2000, an acid value of 0-35 mg of KOH/g and a hydroxyl value of 80-400 mg of KOH/g, preferably, of 180-270 mg of KOH/g.

The polyester oligomer A2) is produced in conventional manner from (1) a hydroxyl component which comprises at least one (cyclo)aliphatic diol and optionally (cyclo)aliphatic polyols with 3 bis 6 hydroxyl groups and (2) a carboxyl component which comprises at least one dicarboxylic acid and optionally, monocarboxylic acids.

Examples of (cyclo)aliphatic diols as hydroxyl components (1) in the polyester oligomer A2) are ethylene glycol, 1,2- and 1,3-propylene glycol, 1,3-, 1,4-, 2,3-butanediol, 1,5-pentanediol, 1,6-hexanediol, trimethylhexanediol, diethylene glycol, triethylene glycol, hydrogenated bisphenols, 1,4-cyclohexanedimethanol, neopentyl glycol, butylethylpropanediol. Hexanediol, neopentyl glycol, butylethylpropanediol are preferred.

Examples of (cyclo)aliphatic polyols with 3 to 6 hydroxyl groups as the hydroxyl component (1) in the polyester oligomer A2) are glycerol, trimethylolpropane, trimethylolethane, pentaerythritol, dipentaerythritol, ditrimethylolpropane, sorbitol, mannitol. Glycerol, trimethylolpropane and pentaerythritol, in particular trimethylolpropane and pentaerythritol, are preferred. Examples of dicarboxylic acids as the carboxyl component (2) in the polyester oligomer A2) are (cyclo)aliphatic dicarboxylic acids, such as, hexahydrophthalic acid, 1,3- and 1,4-cyclohexanedicarboxylic acid, succinic acid, adipic acid, sebacic acid, azelaic acid, dodecanedicarboxylic acid and dimer fatty acids, preferably, $C_{36}$-dimer fatty acid. Dimer fatty acids comprise industrial mixtures, which may also contain olefinic and/or aromatic carbon-carbon double bonds. While unsaturated dicarboxylic acids such as tetrahydrophthalic acid, maleic acid, fumaric acid are indeed possible, they are preferably not used. Preferred compounds are hexahydrophthalic acid, 1,4-cyclohexanedicarboxylic acid, adipic acid and dimer fatty acid, in the case of dimer fatty acid in particular those grades containing no or only small proportions of olefinic and/or aromatic carbon-carbon double bonds. If they exist, the corresponding dicarboxylic anhydrides may also be used instead of the dicarboxylic acids.

Examples of (cyclo)aliphatic monocarboxylic acids as the carboxyl components (2) in the polyester oligomer A2) are saturated fatty acids, such as for example 2-ethylhexanoic acid, isononanoic acid, coconut fatty acid, decanoic acid, dodecanoic acid, tetradecanoic acid, stearic acid, palmitic acid. Isononanoic acid, coconut fatty acid are preferred.

The polyester oligomer A2) may optionally also contain at least one (cyclo)aliphatic hydroxycarboxylic acid (3), but not in an amount of greater than 10 wt. % of the components (1) to (3) used in the polyester oligomer A2). Examples of hydroxycarboxylic acids are 12-hydroxystearic acid, 6-hydroxyhexanoic acid, citric acid, tartaric acid, dimethylolpropionic acid. If they exist, the corresponding lactones may also be used instead of the monohydroxycarboxylic acids.

The polyester oligomer A2) may be produced by polycondensation from the previously stated components (1), (2) and optionally (3), wherein components (1) to (3) are selected in nature and quantity such that the above-stated characteristics (calculated molecular mass, calculated hydroxyl functionality, hydroxyl and acid value) are obtained for the polyester polyol A2). Polycondensation may be performed using conventional processes familiar to the person skilled in the art, for example, in the presence of conventional esterification catalysts and at elevated temperatures of, for example, 180 to 250° C., for example, in a melt. Entraining agents, such as, for example, xylene, may optionally also be used. Components (1) to (3) may be reacted together in a multi- or preferably single-stage synthesis process to yield the polyester oligomer A2). Preferably, all the components (1) to (3) are initially introduced at the same time and heated together, so optionally being melted, and polycondensed together to yield the polyester oligomer A2).

Conversion of the hydroxy-functional binder A) into the aqueous form may proceed in the conventional manner known to the person skilled in the art by partial or complete neutralization of the acid groups of the polyester polyol/(meth)acrylic copolymer hybrid binder A) with bases, such as, amines and/or aminoalcohols and/or by addition of non-ionic emulsifiers and conversion into the aqueous phase. Organic solvents may be removed before or after addition of water, for example by distillation.

The hydroxy-functional binder A) prepared from (meth) acrylic copolymer A1) and polyester oligomer A2) exhibits, for example, a hydroxyl value of 120-250, preferably, of 140-200 mg of KOH/g and an acid value of 20-50, preferably, of 25-40 mg of KOH/g.

Apart from the hydroxy-functional (meth)acrylic copolymers A), the coating compositions according to the invention can also contain other hydroxy-functional binders. Examples of these other hydroxy-functional binders are those hydroxy-functional binders known to the person skilled in the art, which are used in the formulation of aqueous coatings. Examples of other hydroxy-functional binders which can be used are hydroxy-functional polyester, alkyd, polyurethane and/or poly(meth)acrylate resins different from the (meth) acrylic copolymers A). These other hydroxy-functional binders can also be present in a modified form, for example, in the form of (meth)acrylated polyesters or (meth)acrylated polyurethanes. They can be used individually or mixed. The proportion of other hydroxy-functional binders can amount to 0 to 50% by weight based on the amount of hydroxy-functional (meth)acrylic copolymers according to the invention which is used. The coating compositions can also contain low molecular reactive components, so-called reactive thinners, which are able to react with the cross-linking components. Examples of these are hydroxy- or amino-functional reactive thinners.

The hydroxy-functional binder A) and the polyisocyanates B) are used in such proportion that the equivalent ratio of hydroxyl groups of binder A) to the isocyanate groups of cross-linking components B) can be 5:1 to 1:5, for example, preferably, 3:1 to 1:3, and in particular preferably 1.5:1 to 1:1.5. If other hydroxy-functional binders and reactive thinners are used, their reactive functions should be taken into account when calculating the equivalent ratio.

The aqueous coating compositions, according to the invention, also contain polyisocyanates with free isocyanate groups (component B) as cross-linking agents. Examples of the polyisocyanates are any number of organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas.

These polyisocyanates are familiar to the person skilled in the art and can be obtained commercially.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI), nonane triisocyanate and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine.

The polyisocyanate cross-linking agents can be used individually or mixed.

These are polyisocyanate cross-linking agents commonly used in the paint industry, and are described in detail in the literature and are also obtainable commercially. The polyisocyanates can also be used in the form of isocyanate-modified resins.

Although not preferred, the polyisocyanates can be used in combination with co-crosslinkers, e.g., in combination with melamine resins and/or blocked polyisocyanates.

It is an advantage of the aqueous coating composition of the present invention that hydrophobic polyisocyanates with free isocyanate groups can be used as crosslinkers, which are not modified with hydrophilic groups. It is a general problem that hydrophilic polyisocyanates (e.g. modified with polyether groups) which guarantee a good compatibility and miscibility with hydroxy binders in aqueous coating compositions on the other hand cause unsufficient water and chemical resistance of the respective coatings.

The coatings, according to the invention, contain water, for example, 40-70% by weight and possibly small amounts of organic solvents, e.g., up to 10. % by weight, based on the entire coating composition. These are organic solvents used in the paint industry known to the person skilled in the art, for example, those which were mentioned previously in the production of the polymers.

The coating compositions according to the invention can contain pigments and/or fillers. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae. Examples of fillers are silicon dioxide, barium sulphate, talcum, aluminium silicate, magnesium silicate.

The coating compositions can contain usual additives. These additives are additives usually used in the paint industry. Examples of such additives are light stabilisers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, curing accelerators for the cross-linking reaction of the OH-functional binders with polyisocyanates, for example, organic metallic salts, such as, dibutyl tin dilaurate, zinc naphthenate and compounds containing tertiary amino groups, such as, triethylamine. The additives are added in the usual amounts familiar to the person skilled in the art.

Either transparent or pigmented coating compositions can be produced. Since this is a two-component system, the binder components A) containing hydroxyl groups, possibly with pigments, fillers and additives generally used for paint, and the polyisocyanate components B) may only be mixed together shortly before application. In principle, the coatings can still be adjusted to spray viscosity with water and/or organic solvents prior to application.

The coating compositions, according to the invention, can be applied using known methods, in particular, by spray application. The coating compositions obtained can be cured at room temperature or forced at higher temperatures, for example, up to 80° C. They can, however, even be cured at higher temperatures of, for example, 80 to 160° C.

The coating compositions, according to the invention, are suitable for automotive and industrial coatings. In the automotive coatings sector, the coatings can be used for both vehicle production line painting and vehicle and vehicle part refinishing. For vehicle production line painting stoving (baking) temperatures of 80 to 160° C., for example, are used, preferably, 110 to 140° C. For refinishing curing temperatures of, for example, 20° C. to 80° C., in particular, 40 to 60° C. are used. The coating compositions can also be used for coating large vehicles and transportation vehicles, such as, trucks, busses and railroad cars, where typically curing temperatures of up to 80-90° C. are used.

The coating compositions according to the invention are suited for use as clear coats but can be pigmented with conventional pigments and used as solid-color topcoats, basecoats or undercoats, such as, primers or sealers. Preferably they can be formulated, as solid-color topcoats or as transparent clear coats and used in the manufacture of the outer solid-color topcoat layer of a multilayer coating or in the production of the outer clear coat layer of a multilayer coating. The present invention thus also concerns the use of the coating compositions, according to the invention, as topcoat coatings and as clear coatings as well as a method for producing multilayer coatings, the solid-color topcoat and transparent clear coat layers of multilayer coatings, in particular, being manufactured from the coating compositions, according to the invention.

The coating compositions in the form of a solid-color topcoat can be applied, for example, to normal one-component or two-component filler layers. However, the coatings according to the invention can also be applied and cured as a filler layer, for example, on normal primers, for example, two-component epoxide primers or on electrodeposition primers.

The coating compositions in the form of transparent clear coats can be applied, for example, using the wet-in-wet process on solvent-based or aqueous color and/or effect-giving basecoat layers. In this case, the color and/or effect-giving basecoat layer is applied to a substrate, precoated if necessary, in particular, to precoated vehicle bodies or parts thereof, prior to the application of the clear coat layer from the clear coat according to the invention. Following a drying period, if allowed for, both layers are cured together. Thus, for vehicle production line painting, drying can take place, for example, at 20 to 80° C. and for refinishing for 15 to 45 minutes at room temperature, depending on relative air humidity.

The coating compositions according to the invention are used to advantage in a multilayer coating to produce solid-color topcoat layers and transparent clear coat layers. The topcoat and clear coat layers possess good resistance to mechanical and weathering influences and exhibit good chemical resistance. The hydroxy functional binders A) can be prepared as solvent-free dispersions and accordingly coating compositions can be formulated with only small amounts of organic co-solvents, usually not more than 10% by weight. The water-dilutable binders A) used in the aqueous coatings can be particularly used to advantage with the usual hydrophobically, i.e., not especially hydrophilically modified polyisocyanate cross-linking agents. They are highly compatible with these polyisocyanate cross-linking agents and, simply by mixing with these, can be converted into water-dilutable two-component coating compositions. This is particularly important for such applications of two-component coating compositions, e.g., in vehicle refinishing, where it should be ensured that components can be mixed simply by hand. On the other hand good compatibility and miscibility with polyisocyanates lead to coatings with satisfactory surface properties, such as, gloss and flow. It is known from prior art that normal paint polyisocyanates, which are relatively hydrophobic, i.e., not specially hydrophilically modified, can only be worked or mixed into aqueous coating compositions with difficulty, particularly if the working in takes place in the absence of large amounts of organic co-solvents and/or without high shear rates.

The invention will be further described by reference to the following Examples. All parts and percentages are on a weight basis unless otherwise indicated. All molecular weights disclosed herein are determined by GPC (gel permeation chromatography) using a polystyrene standard.

EXAMPLES

Examples 1-2

Production of a seed Polymer 1 from acrylate copolymer 1 and polyester 1

First of all, polyester 1 was produced as follows:

10 g of adipic acid, 453 g of hexahydrophthalic anhydride and 532 g of hexanediol were melt esterified at 200° C. to an acid value of 4 mg of KOH/g with 50 g of hypophosphorous acid in a 2 liter three-necked flask equipped with a stirrer, separator, thermometer and reflux condenser. Condensation was then performed under a vacuum down to an acid value of below 1.5 mg of KOH/g.

Solids content (SC): 94.5%

OH value (OHV): 184 mg KOH/g solid resin

Colour index: 0 Gardner 6.4 g of ethoxypropanol, 7.4 g of Cardura®) E 10 (Shell AG) and 6.3 g of polyester 1 were then introduced into a three-necked flask with a stirrer, reflux condenser and dropping funnel and temperature control and heated to 145° C. As soon as the temperature was reached, a monomer mixture of 2.15 g of acrylic acid, 8.33 g of styrene and 2.76 g of hydroxyethyl acrylate was simultaneously apportioned over 2.5 hours with 0.25 g of dicumyl peroxide dissolved in 2.0 g of ethoxypropanol. The mixture continued to polymerize for 30 minutes after completion of addition. The monomer mixture for the 2nd stage consisting of 1.55 g of acrylic acid, 8.68 g of isobutyl acrylate and 4.36 g of hydroxyethyl acrylate was then simultaneously apportioned at the same temperature over 2.5 hours with the initiator solution of 0.15 g of dicumyl peroxide and 1.2 g of ethoxypropanol. The mixture continued to polymerise for 3 hours after the completion of addition. The solvent was then removed by distillation. The resin was cooled to 80° C. and neutralized with 1.5 g of dimethylethanolamine. 46.0 g of water were then added. A solvent-free dispersion with the following characteristics was obtained:

Ratio of primary OH:secondary OH in the acrylate moiety: 1:0.5

Acid value (AV): 29 mg KOH/g solid resin

OHV: 149 mg KOH/g solid resin

Degree of neutralization: 70%

Mw/Mn: 45000/4000

SC: 42%

Production of a seed Polymer 2 from acrylate copolymer 2 and polyester 2

Polyester 2 was produced as follows:

222 g of isononanoic acid, 300 g of hexahydrophthalic anhydride and 287 g of pentaerythritol were melt esterified at 200° C. to an acid value of 30 mg of KOH/g solid resin with 50 g of hypophosphorous acid in a 2 litre three-necked flask equipped with a stirrer, separator, thermometer and reflux condenser.

SC: 94.5%

OHV: 264 mg KOH/g solid resin

Colour index: 0 Gardner 0.6 g of ethoxypropanol, 10.6 g of Cardura® E 10 (Shell AG) and 26.01 g of polyester 2 were then introduced into a three-necked flask with a stirrer, reflux condenser and dropping funnel and temperature control and heated to 145° C. A monomer mixture of 1.9 g of acrylic acid, 7 g of styrene and 2.7 g of hydroxyethyl methacrylate was then apportioned over 2.5 hours simultaneously with 0.2 g of dicumyl peroxide dissolved in 0.8 g of ethoxypropanol. Polymerization was continued for 30 minutes after completion of addition. The monomer mixture for the 2nd stage consisting of 2.2 g of acrylic acid, 4.2 g of isobutyl acrylate and 2.2 g of hydroxyethyl acrylate was then simultaneously apportioned over 2.5 hours with the initiator solution of 0.1 g of dicumyl peroxide and 0.6 g of ethoxypropanol. Polymerization was continued for 3 hours after completion of addition. The solvent was then removed by distillation. The resin was cooled to 80° C. and neutralised with 1.6 g of dimethylethanolamine. 39.3 g of water were then added. A solvent-free aqueous dispersion with the following characteristics was obtained:

Ratio of primary OH:secondary OH in the acrylate moiety: 1:1.1

SC: 50%

AV: 29 mg of KOH/g of solid resin

OHV: 190 mg KOH/g of solid resin

Degree of neutralisation: 70%

Mw/Mn: 23 000/2 900

Examples 3-4 (Comparative Examples)

Production of a Comparison Seed Polymer 3 from Acrylate Polymer 3 and Polyester 1 Corresponding to EP 626 432

6.3 g of diethylene glycol monobutyl ether, 17.7 g of Cardura® E 10 and 7.0 g of polyester were initially introduced into a three-necked flask with stirrer, reflux condenser, dropping funnel and temperature control and heated to 145° C. As soon as the temperature was reached, a monomer mixture of 6.92 g of acrylic acid, 2.44 g of lauryl acrylate, 2.44 g of styrene, 4.9 g of isobutyl methacrylate, 4.96 g of butanediol monoacrylate and 7.63 g of isobutyl methacrylate was simultaneously apportioned over 5 hours with 0.28 g of Trigonox B and 1.68 g of Trigonox 21. The mixture continued to polymerize for 2 hours after the completion of addition. The resin was cooled to 80° C. and neutralised with 1.75 g of dimethylethanolamine. 36.0 g of water were then added.

Ratio of primary OH:secondary OH in the acrylate moiety: 1:2

AV: 26 mg KOH/g of solid resin

OHV: 129 mg KOH/g of solid resin

Degree of neutralization: 70%

SC: 56%

Production of a Comparison Seed Polymer 4 from Acrylate Copolymer 4 and Polyester 1

6.1 g of ethoxypropanol, 7.04 g of Cardura® E 10 and 5.93 g of polyester 1 were initially introduced into a three-necked flask with stirrer, reflux condenser, dropping funnel and temperature control and heated to 145° C. As soon as the temperature was reached, a monomer mixture of 2.03 g of acrylic acid, 7.66 g of styrene and 2.6 g of hydroxyethyl acrylate was simultaneously apportioned over 2.5 hours with 0.46 g of Trigonox B dissolved in 1.9 g of ethoxypropanol. The mixture continued to polymerize for 30 minutes after completion of addition. The monomer mixture for the 2nd stage consisting of 1.46 g of acrylic acid, 7.7 g of isobutyl acrylate 3.0 g of hydroxypropyl acrylate and 1.43 g of hydroxyethyl acrylate was then simultaneously apportioned at the same temperature over 2.5 hours with the initiator solution of 0.28 g of Trigonox B and 1 g of ethoxypropanol. Polymerisation was continued for 3 hours after completion of addition. The solvent was then removed by distillation. The resin was cooled to 80° C. and neutralized with 1.21 g of dimethylethanolamine. 94.4 g of water were then added.

Ratio of primary OH:secondary OH in the acrylate moiety: 1:1.5

AV: 29 mg KOH/g of solid resin

OHV: 149 mg KOH/g of solid resin

Degree of neutralisation: 70%

Mw/Mn: 17800/3600

SC: 39.6%

Examples 5-6

Production of a Clear Coat on the Basis of Seed Polymer 1(CC1)

The clear coat formulation was produced by mixing 53.1 parts of seed polymer 1 with 8.8 parts of Dowanol® PnB (from Dow Chemical) and 21.2 parts of deionised (DI) water. The clear coat was mixed with 16.9 parts of Desmodur® XP 2410 (80% in ethylene glycol monobutyl ether acetate) (asymmetric HDI-based polyisocyanate, Bayer) and adjusted to a viscosity of 25 s (measured according to DIN EN ISO 2431, DIN 4 Cup).

Production of a Clear Coat on the Basis of Seed Polymer 2(CC2)

The clear coat formulation was produced by mixing 48.6 parts of seed polymer 2 with 6.6 parts of Dowanol® PnB (from Dow Chemical) and 14.5 parts of deionised (DI) water. The clear coat was mixed with 23.1 parts of curing agent Desmodur® XP 2410 (80% in ethylene glycol monobutyl ether acetate) (asymmetric HDI-based polyisocyanate, Bayer) and adjusted with deionised water to 25 s (measured according to DIN EN ISO 2431, DIN 4 Cup).

Clear coats 1 and 2 were in each case applied with a spray gun onto coil coating sheet to a dry film thickness of 40-50 µm. After flashing off for 35 minutes, curing was performed for 30 minutes at 80° C.

The following table shows the coating results.

| | | CC1 | CC2 |
|---|---|---|---|
| gloss - 20°/60° | | 84/91 | 83/91 |
| Haze | | 21 | 40 |
| Xylene resistance (1 hour after bake) | | | |
| Hardness | | 5 | 7 |
| Swelling | | 6 | 6 |
| Hardness | after 1 day of regeneration | 9 | 9 |
| Swelling | | 8 | 8 |
| water resistance (1 hour after bake) | | | |
| Hardness | after 1 hour | 9 | 9 |
| Swelling | | 10 | 10 |
| Hardness | after 1 day of regeneration | 9 | 9 |
| Swelling | | 10 | 10 |
| Pendulum hardness after König Dry film thickness | | 51 µm | 59 µm |
| Pendulum after 1 h | | 55/58 | 92/92 |
| Pendulum after 1 day | | 109/115 | 135/135 |
| Pendulum after 7 days | | 132/127 | 141/142 |

Examples 7-8 (Comparative Examples)

Production of Comparison Clear Coats on the Basis of Comparison Seed Polymers 3 and 4 (CC3, CC4)

52.2 parts of seed polymer 3 were mixed with 2.7 parts of Dowanol® PnB (from Dow Chemical) and 20.9 parts of DI water. Curing proceeds with 17.6 parts of Desmodur® XP 2410 (80% in ethylene glycol monobutyl ether acetate) (asymmetric HDI-based polyisocyanate, Bayer). Viscosity was adjusted to 20 s (measured according to DIN EN ISO 2431, DIN 4 Cup) with DI water.

58.9 parts of seed polymers 4 were mixed with 8.6 parts of Dowanol® PnB (from Dow Chemical) and 14.7 parts of DI water. Curing proceeds with 17.8 parts of Desmodur® XP 2410 (80% in ethylene glycol monobutyl ether acetate) (asymmetric HDI-based polyisocyanate, Bayer). Viscosity was adjusted to 20 s (measured according to DIN EN ISO 2431, DIN 4 Cup) with DI water.

The comparison clear coats were in each case applied with a spray gun onto coil coating sheet to a dry film thickness of 40-50 µm. After flashing off for 35 minutes, curing was performed for 30 minutes at 80° C.

The following table shows the coating results.

| | | CC3 | CC4 |
|---|---|---|---|
| gloss - 20°/60° | | 79/88 | 85/91 |
| Haze | | 15 | 11 |
| Xylene resistance (1 hour after bake) | | | |
| Hardness | | 1 | 2 |
| Swelling | | 2 | 4 |
| Hardness | after 1 day of regeneration | 9 | 9 |
| Swelling | | 10 | 9 |
| Water resistance (1 hour after bake) | | | |
| Hardness | | 9 | 9 |
| Swelling | | 10 | 10 |
| Hardness | after 1 day of regeneration | 9 | 9 |
| Swelling | | 10 | 10 |
| Pendulum hardness after König | | 62 µm | 51 µm |
| Pendulum after 1 h Dry film thickness | | 6/6 | 44/40 |
| Pendulum after 1 day | | 16/16 | 98/101 |
| Pendulum after 7 days | | 22/23 | 124/121 |

The good compatibility/miscibility of the seed polymers to be used according to the invention with the appropriate polyisocyanate curing agents is clear from the improved resistance to xylene and water and the improved pendulum hardness of 5 the clear coats according to the invention relative to the comparison clear coats.

Test Methods:

Xylene Test:

Filter pads were soaked in xylene. The filter pads were lifted individually from the test fluid and, once excess liquid had drained off, were laid with the smooth side on the test coating and immediately covered with a watch glass. After 3 minutes, the filter pads were removed and the exposed test surface wiped down.

Hardness was then immediately evaluated by scratching with a finger nail (finger nail test) and comparison with the unexposed part of the test coating. Swelling was evaluated visually.

Evaluation was made in accordance with the scale below.

Water Test:

Drops of deionized water were placed onto the test coating with a pipette. The drops were removed after 15 minutes and the exposed test surface wiped dry. Hardness was then immediately evaluated by scratching with a finger nail and comparison with the unexposed part of the test coating. Swelling was evaluated visually.

Evaluation was made in accordance with the scale below.

| | | Hardness | Swelling |
|---|---|---|---|
| 10 | perfect | no penetration | no swelling |
| 9 | excellent | | |
| 8 | very good | very slight penetration | very slight swelling |
| 7 | good-very good | | |
| 6 | good | slight penetration | slight swelling |
| 5 | fairly good, but not com. acceptable | | |

-continued

| | | Hardness | Swelling |
|---|---|---|---|
| 4 | fair | medium strong penetration | medium strong swelling |
| 3 | poor fair | | |
| 2 | poor | strong penetration | strong swelling |
| 1 | very poor | | |
| 0 | totally unacceptable | very strong penetration | very strong swelling |

The invention claimed is:

1. An aqueous coating composition, consisting of:

A) at least one water-dilutable hydroxy-functional binder,

B) at least one polyisocyanate crosslinking agent with free isocyanate groups,

C) 40% to 70% by weight of water based on the entire weight of said aqueous coating composition, and D) light stabilizers, flow control agents, rheology influencing agents, thickeners, anti-foaming agents, wetting agents, organic metallic salts, pigments, organic solvents, fillers or a combination thereof and wherein component A) consists of A1) 40-95 wt. % of at least one water-dilutable hydroxy-functional (meth)acrylic copolymer with a hydroxyl value of 60-250 mg of KOH/g and an acid value of 5-50 mg of KOH/g, which is obtained by free-radical copolymerization performed in a non-aqueous phase by I) polymerizing the following monomers in a first stage:

a) 20-65 wt. % of a reaction product of a glycidyl ester derived from aliphatic saturated monocarboxylic acid with a tertiary or quaternary carbon atom in the alpha position and an unsaturated acid-functional monomer, b) 5-20 wt. % of at least one hydroxy-functional unsaturated monomer which differs from component a), c) 0-15 wt. % of an unsaturated acid-functional monomer and d) 5-70 wt. % of at least one other polymerizable unsaturated monomer, wherein the weight percentages of components a) to d) add up to 100 wt. % and II) polymerizing the following monomers in at least one further stage:

b) 15-40 wt. % of at least one hydroxy-functional unsaturated monomer which differs from component a), c) 5-30 wt. % of an unsaturated acid-functional monomer and d) 30-80 wt. % of other polymerizable unsaturated monomers, wherein the weight percentages of components b) to d) add up to 100 wt. % and wherein the ratio of primary hydroxyl groups to secondary hydroxyl groups in the (meth)acrylate A1) copolymer is 1:0.1 to 1:1.2 and at least 80% of the secondary hydroxyl groups result from the monomers a), and A2) 5-60 wt. % of at least one water-dilutable polyester oligomer, wherein the total of the weight percentages of component A1) and A2) add up to 100 wt. % and wherein the free-radical polymerization for the production of component A1) is performed at least in part in the presence of component A2) and wherein said water-dilutable hydroxy-functional binder is converted into an aqueous form by partially or completely neutralizing acid groups with bases.

2. The coating composition according to claim 1, wherein the (meth)acrylic copolymer A1) has a hydroxyl value of 80-170 mg of KOH/g and an acid value of 10-35 mg of KOH/g.

3. The coating composition according to claim 1, wherein the polyester oligomer A2) has a calculated molar mass of 200-4000, a hydroxyl value of 80-400 mg KOH/g and an acid value of 0-35 mg KOH/g.

4. The coating composition according to claim 1, wherein the hydroxy-functional binder A) has a hydroxyl value of 120-250 mg of KOH/g and an acid value of 20-50 mg of KOH/g.

5. A process for the production of a multilayer coating on a substrate using a coating composition according to claim 1 and curing the coating.

6. A process for the production of a coating layer as a coating layer of a multilayer coating comprising the application and curing of a coating layer selected from the group consisting of outer pigmented top coat and transparent clear coat layers, wherein this coating layer is applied from a coating composition according to claim 1.

7. The process according to claim 5, wherein the substrates comprise automotive bodies, parts of automotive bodies or mixtures thereof.

8. The process according to claim 6, wherein the substrates comprise automotive bodies, parts of automotive bodies or mixtures thereof.

9. The composition of claim 1, wherein said component A) comprises 55-75 wt. % of said component A1) and 25-45 wt. % of said component A2).

10. An aqueous coating composition, consisting of:

A) at least one water-dilutable hydroxy-functional binder

B) at least one polyisocyanate crosslinking agent with free isocyanate groups,

C) 40% to 70% by weight of water based on the entire weight of said aqueous coating composition, D) light stabilizers, flow control agents, rheology influencing agents, thickeners, anti-foaming agents, wetting agents, organic metallic salts, pigments, organic solvents, fillers, or a combination thereof, and wherein component A) consists of A1) 40-95 wt. % of at least one water-dilutable hydroxy-functional (meth)acrylic copolymer with a hydroxyl value of 60-250 mg of KOH/g and an acid value of 5-50 mg of KOH/g, which is obtained by free-radical copolymerization performed in a non-aqueous phase by I) polymerizing the following monomers in a first stage:

a) 20-50 wt. % of a reaction product of a monoepoxy ester and an unsaturated acid-functional monomer, b) 10-30 wt. % of at least one hydroxyalkyl ester derived from alpha, beta-olefinic unsaturated monocarboxylic acids, c) 5-15% by weight of at least one unsaturated acid functional monomer, d1) 15-25 wt. % of at least one vinyl aromatic polymerisable unsaturated monomer and d2) 5-30 wt. % of at least one ester of (meth)acrylic acid with aliphatic monohydric branched or linear as well as cyclic alcohols with 1 to 20 C atoms, wherein the weight percentages of components a) to d2) add up to 100 wt. % and II) polymerizing the following monomers in at least one further stage:

b) 15-40 wt. % of at least one hydroxy-functional unsaturated monomer which differs from component a), c) 5-30 wt. % of an unsaturated acid-functional monomer and d) 30-80 wt. % of other polymerizable unsaturated monomers, wherein the weight percentages of components b) to d) add up to 100 wt. % and wherein the ratio of primary hydroxyl groups to secondary hydroxyl groups in the (meth)acrylate A1) copolymer is 1:0.1 to 1:1.2 and at least 80% of the secondary hydroxyl groups result from the monomers a), and A2) 5-60 wt. % of at least one water-dilutable polyester oligomer, wherein the total of the weight percentages of component A1) and A2) add up to 100 wt. % and wherein the free-radical polymerization for the production of component A1) is performed at least in part in the presence of component A2) and wherein said water-dilutable hydroxy-functional binder is converted into an aqueous form by partially or completely neutralizing acid groups with bases.

* * * * *